United States Patent [19]

Billatos

[11] Patent Number: 5,799,553
[45] Date of Patent: Sep. 1, 1998

[54] APPARATUS FOR ENVIRONMENTALLY SAFE COOLING OF CUTTING TOOLS

[75] Inventor: Samir B. Billatos, E. Brunswick, N.J.

[73] Assignee: University of Connecticut, Storrs, Conn.

[21] Appl. No.: 789,683

[22] Filed: Jan. 27, 1997

Related U.S. Application Data

[63] Continuation of Ser. No. 385,570, Feb. 8, 1995, abandoned.

[51] Int. Cl.$^6$ .................................................. B23B 27/00
[52] U.S. Cl. ............................ 82/1.11; 82/900; 408/56; 407/11
[58] Field of Search .................... 407/11; 409/135, 409/136; 408/56, 58; 82/1.11, 900

[56] References Cited

U.S. PATENT DOCUMENTS

| | | |
|---|---|---|
| 160,161 | 2/1875 | Clay . |
| 354,498 | 12/1886 | Vanden Kerchove . |
| 1,119,669 | 12/1914 | Wigness . |
| 1,320,162 | 10/1919 | Marsh et al. . |
| 1,369,821 | 3/1921 | Layman . |
| 1,695,955 | 12/1928 | Frayer . |
| 2,653,517 | 9/1953 | Pigott . |
| 2,674,780 | 4/1954 | Nielsen . |
| 2,713,282 | 7/1955 | Burgsmüller . |
| 2,718,689 | 9/1955 | Mason et al. . |
| 2,745,318 | 5/1956 | Williams . |
| 3,022,710 | 2/1962 | Kopec . |
| 3,027,625 | 4/1962 | Milstead . |
| 3,077,802 | 2/1963 | Philip . |
| 3,091,985 | 6/1963 | Whalen . |
| 3,104,826 | 9/1963 | Morris . |
| 3,137,184 | 4/1964 | Meyers . |
| 3,293,727 | 12/1966 | Simms . |
| 3,486,378 | 12/1969 | Carlson ............................. 82/900 |
| 3,570,332 | 3/1971 | Beake . |
| 3,571,877 | 3/1971 | Zerkle . |
| 3,605,551 | 9/1971 | Steward . |
| 3,664,412 | 5/1972 | Zerkle . |
| 3,861,011 | 1/1975 | Nose et al. . |
| 3,889,520 | 6/1975 | Stöferle et al. . |

(List continued on next page.)

FOREIGN PATENT DOCUMENTS

| | | | |
|---|---|---|---|
| 419428 | 3/1991 | European Pat. Off. ............. 408/56 |
| 266519 | 4/1989 | German Dem. Rep. ............. 407/11 |
| 883547 | 7/1953 | Germany ......................... 407/11 |
| 1049661 | 1/1959 | Germany ......................... 407/11 |
| 23780 | 2/1977 | Japan ............................... 407/11 |
| 60-0052205 | 3/1985 | Japan ............................... 407/11 |
| 846229 | 7/1981 | U.S.S.R. .......................... 407/11 |
| 1171219 | 8/1985 | U.S.S.R. .......................... 407/11 |

OTHER PUBLICATIONS

T. H. C. Childs, K. Maekawa, P. Maulik, "Effect of Coolant on Temperature Distribution in Metal Machining", Materials Science and Technology, Nov. 1988. vol. 4, pp. 1006–1017.

Samir B. Billatos and Ayman S. Ayad, "An Innovative Approach to Environmentally Sage Machining", DE–vol. 74, Concurrent Product Design ASME 1994; pp. 1–8.

S. B. Billatos and N. Abdel–Malak, "A Design for the Environement Application in Machining", Society of Manufactuing Engineers Sep. 27–29, 1994, pp. 1–9.

*Primary Examiner*—A. L. Pitts
*Assistant Examiner*—Henry W.H. Tsai
*Attorney, Agent, or Firm*—Fishman, Dionne, Cantor & Colburn

[57] ABSTRACT

The invention is an arrangement whereby fluid dynamics is used to provide a cooling effect to a cutting tool while in use. More specifically, the invention is based upon the principles that fluid expands when sent through a restricted diameter channel which concomitantly to expansion and reduced pressure also causes a markedly reduced temperature of the arrangement. A cooling element comprising a long, restricted channel arranged on a support plate in a tightly spaced continuous pattern and having an inlet for any desired cooling fluid and an outlet. Cooling fluids can be contained within the system for indefinite reuse or can be cycled through (i.e. air or water). Preferred cooling fluids are tap water or ambient air.

8 Claims, 12 Drawing Sheets

U.S. PATENT DOCUMENTS

| | | |
|---|---|---|
| 3,971,114 | 7/1976 | Dudley . |
| 4,312,251 | 1/1982 | Schwan . |
| 4,320,999 | 3/1982 | Briese ................................... 409/136 |
| 4,322,189 | 3/1982 | Briese . |
| 4,370,999 | 2/1983 | Sebillotte . |
| 4,563,924 | 1/1986 | Runkle et al. . |
| 4,791,840 | 12/1988 | De Rosier et al. . |
| 4,848,198 | 7/1989 | Royal et al. . |
| 4,919,232 | 4/1990 | Lofton . |
| 5,103,701 | 4/1992 | Lundin et al. ............................ 407/11 |
| 5,141,079 | 8/1992 | Whitney et al. . |
| 5,148,728 | 9/1992 | Mazukiewicz . |

APPARATUS FOR ENVIRONMENTALLY SAFE COOLING OF CUTTING TOOLS

This is a continuation of application Ser. No. 08/385,570 filed on Feb. 8, 1995, now abandoned.

BACKGROUND OF THE INVENTION

1. Field of the Invention

The invention relates to cooling cutting tools in an environmentally sound way using simple fluid dynamics and environmentally safe materials as the cooling fluid.

2. Prior Art

Heretofore, cooling of all types of cutting tools for metal cutting, stone cutting, etc. has been accomplished using fluids which are sprayed injected or otherwise applied to the area where cutting tools are actually being employed. Many arrangements have been disclosed and used such as machine mounted liquid application devices, fluid channels in the tools themselves and thermoelectric effects, among others. U.S. Patents representative of the prior art include U.S. Pat. Nos. 4,370,999; 4,312,251; 3,077,802; 3,137,184; 3,570,332; 3,104,826; 3,971,114, etc.

Coolant sprayed or otherwise applied to a cutting tool from a machine mounted application device is extremely effective for cooling the tool however is environmentally unsound and is therefore undesirable in a tide of increasingly restrictive environmental regulations. Moreover, these methods do suffer from the drawback of speeded oxidation of the tool surface from contact with the coolant. Oxidation, of course, reduces the sharpness of the tool rapidly and therefore the stated methods are not always cost effective. Another serious drawback of spraying fluids is that very often toxic aerosols are produced by the rapidly evaporating material on the hot surface of the cutting tool. This is often dangerous for both workers and the environment.

In alternative methods such as supplying the tool itself with coolant channel(s) and outlet(s), the coolant is delivered to the target area even more accurately, and thus effectively than remote applicator types, however there are serious drawbacks in this technology also. Obviously, there is still the inherent environmental threat for using cooling solutions and chemicals, but on a more economic front there is also the consideration of tool breakage due to compromises in the structural integrity caused by the internal channels. Moreover, the accelerated oxidation process makes breakage an even more common occurrence. Additionally, and not to be taken lightly, is that conventional non-internally channelled tools are not useable and new tools must be acquired at a not inconsiderable expense. Thermo-electric devices, while perhaps not directly polluting the environment, do have drawbacks also. Thermo-electric devices alone do not sufficiently cool the tool; additional materials or fluids are necessary. These result in a bulky and heavy device. Moreover these devices are not considered reliable for long term industrial use.

SUMMARY OF THE INVENTION

The above-discussed and other drawbacks and deficiencies of the prior art are overcome or alleviated by the cooling arrangement of the present invention.

A retro-fittable cooling arrangement for cutting tools is disclosed. The arrangement uses fluids such as ambient air or simple tap water run through a restricted diameter channel to cool a cutting tool. Elementary fluid dynamics dictates that as a fluid passes through a restricted diameter channel its velocity increases thus reducing temperature and pressure. In the invention described herein, the reduced temperature is used to cool a cutting tool. For the purposes described herein, cooling elements comprise one or more plates with a continuous tightly placed restricted channel. Each plate includes an inlet and an outlet for the fluid to be used. Any fluid is effective, with water and ambient air being the most preferable fluids. Cooling elements of the invention are secured in contact with the cutting tool to conduct heat away therefrom. Alternatively, the cooling element may be mounted on a tool holder constructed from a conductive medium.

The invention is environmentally sound, causing only a small amount of thermal energy (which may even be used to heat work structures in cooler climates) and is highly cost effective since no chemicals are necessary and the substantial cost of toxic material disposal is avoided.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE PREFERRED EMBODIMENT

The invention is based primarily on the cooling effect of a fluid passed through a restricted channel as governed by elementary fluid dynamics laws. A fluid flowing from a less restricted channel to a more restricted channel will necessarily increase velocity and consequently decrease temperature and pressure. Fluid flow in such a duct is governed by the Navier-Stokes equations derived from the conservation of mass, momentum and energy of the fluid. An analysis of the duct using these equations would reveal the heat transfer to the air given the pressures at entry and exit of the restricted channel. The flow in the duct can be approximated using quasi-one dimensional theory. This analysis can be found in gas dynamics and compressible fluids text books such as Anderson. The flow can be assumed to be steady, inviscid, and isentropic. The condition of isentropic flow is violated by the heat transfer application, however the analysis will provide a good estimate of the temperature in the duct. The temperature at any location in the duct can be determined from the adiabatic relationship:

$$T = T\left(1 + \frac{\gamma-1}{2} M^2\right)^{-1} \quad (1)$$

The Mach number, M, is a function of the area of the duct and can be determined using the relation:

$$\left(\frac{A_1}{A_2}\right)^2 = \frac{M_2^2 \Phi_1}{M_1^2 \Phi_2} \quad (2)$$

where $$\Phi = \left[\frac{1}{\gamma+1}\left(1 + \frac{\gamma-1}{2} M^2\right)\right]^{\frac{\gamma+1}{\gamma-1}} \quad (3)$$

If $A_1$ is taken to be an area where the pressure is known, such as the exit area from the restricted channel, then $M_1$ can be found from the relation:

$$\frac{P}{p} = \left(1 - \frac{\gamma-1}{2} M^2\right)^{\frac{\gamma}{\gamma-1}} \quad (4)$$

where p is the stagnation pressure taken to be the pressure at the compressor stage. Once the Mach number at the inlet or exit is determined, the Mach number at any other point in the duct can be determined from the equation (2). The temperature can subsequently be found from equation (1).

Using these mathematical fluid dynamics equations one of skill in the art will be enabled to produce the invention which is discussed hereunder.

Referring now to FIGS. 1–5 simultaneously, the cooling element 1 comprising restricted channel 3 and a support plate 5 is easily understood by one of skill in the art. It is advantageous to maintain minimal spacing between the adjacent portions of the channel to obtain maximum cooling effect. The cooling effect is obtained by conductance of heat from the tool to the temperature reduced channel as it winds around itself or part of the tool. Different diameters of the channel, as chosen by the use of the equations set forth above, have different capacities for cooling the tool. Various sizes of element 1 are useable in addition to various diameters of the restricted channels. Generally dimensions are varied to suit particular needs.

In each preferred embodiment a cooling element 1 is placed immediately in contact with a cutting tool or in contact with a temperature conductive tool holder. In any case very effective cooling can be achieved.

Figure 6A:
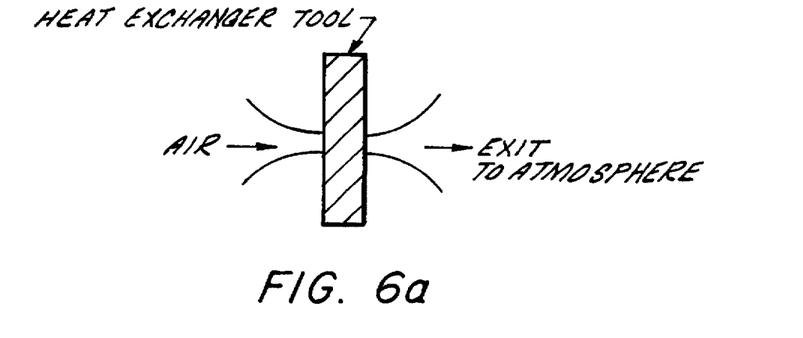
FIG. 6a is a diagrammatic view of a fluid flowing through a restricted diameter channel with the heat exchanger positioned at the most restricted zone.
Figure 6B:
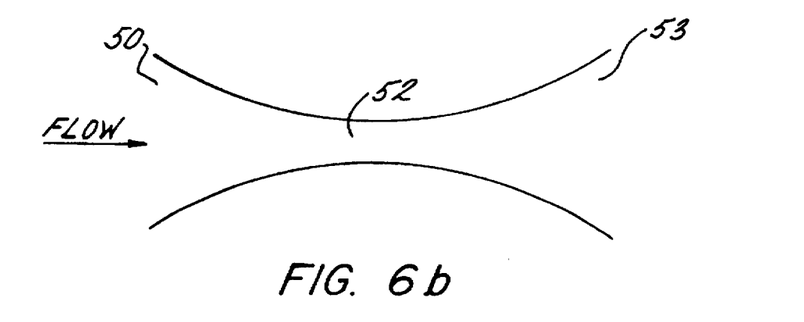
FIG. 6b is a diagrammatic view of a restricted channel without the heat exchanger and which identifies zones.
Figure 6C:
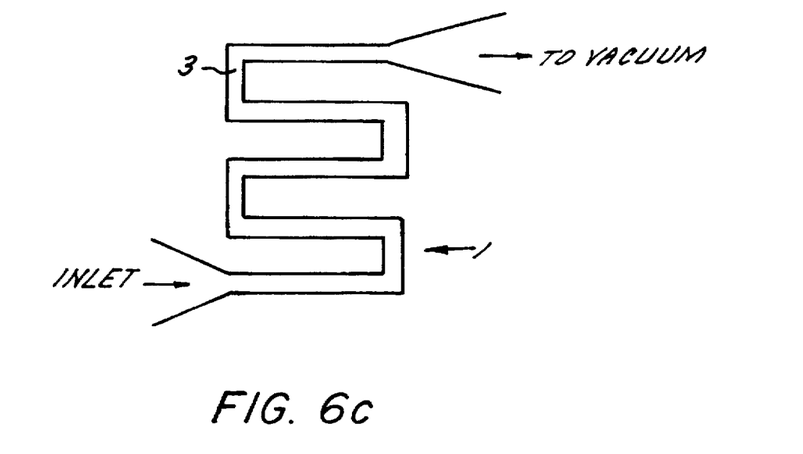
FIG. 6c is a diagrammatic view of a cooling element with the restricted channel meandering in a location of desired cooling.

FIGS. 6a–c schematically illustrate the concept of the invention. At the restricted portion of each of the figures the velocity of the fluid traveling therethrough is increased and the temperature (and pressure) is reduced thereby providing the desired cooling effect. Referring to FIG. 6b the concept is quite clear; the most restricted and therefore coolest area is designated 52. Inlet 50 and outlet 53 are of greater cross section and are not significantly cooled. Therefore, to cool a layer area, an embodiment similar to FIG. 6c is preferred; one of skill in the art will easily appreciate the invention.

One of the most preferred embodiments utilizes a rectangular shaped cooling element mounted between the cutting tool and the tool holder. This arrangement has been found to be effective as evidenced by the following example.

In order to fully describe the following example reference is made to FIGS. 1 through 14 which will be referred to throughout the description.

Figure 7:
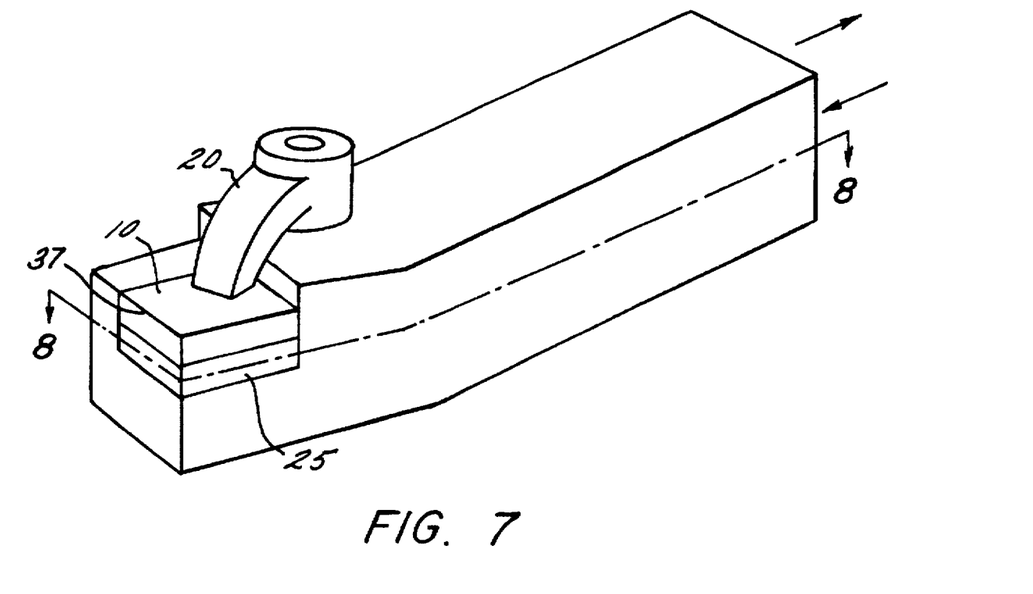
FIG. 7 is a perspective view of a cutting tool employed in the example set forth in the detailed description.
Figure 8:
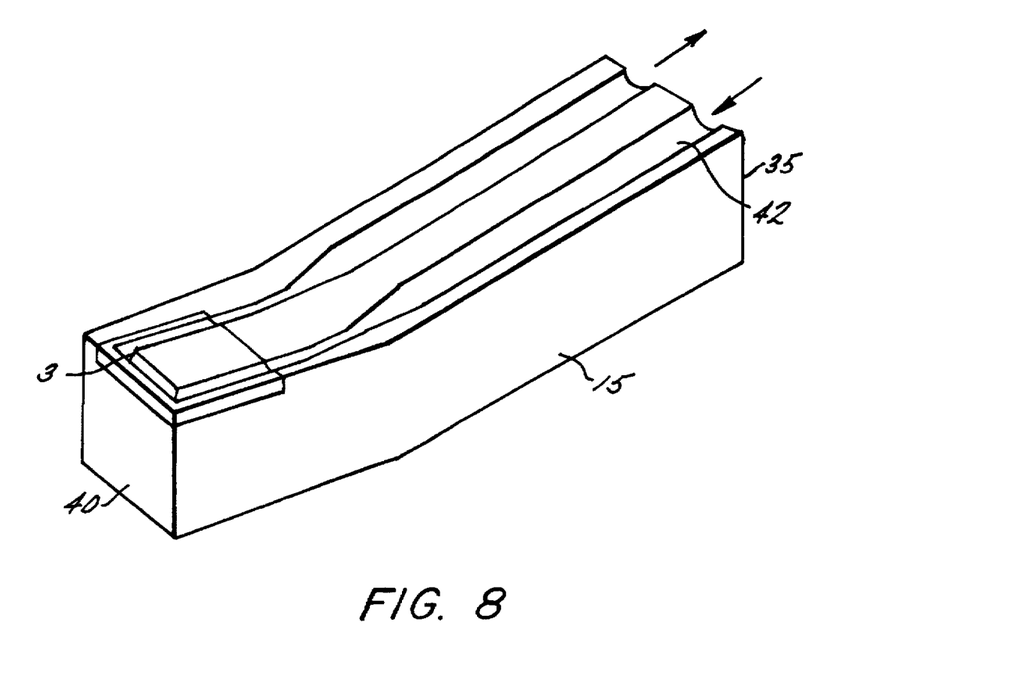
FIG. 8 is a perspective sectional view of FIG. 7 taken along section line 8—8.
Figure 9:
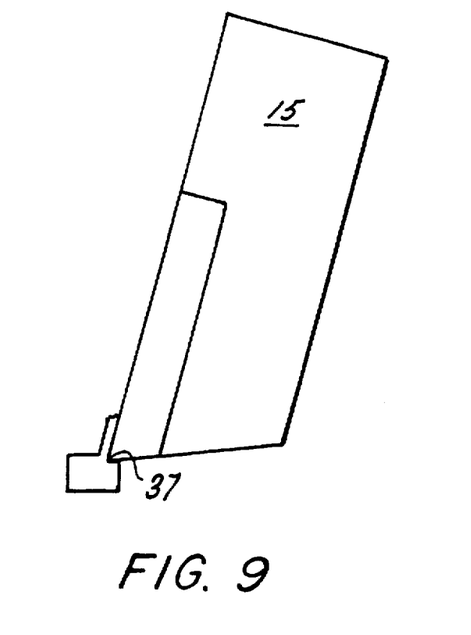
FIG. 9 is an enlarged view of the cutting tool shearing a chip from a cutting surface.
Figure 10:
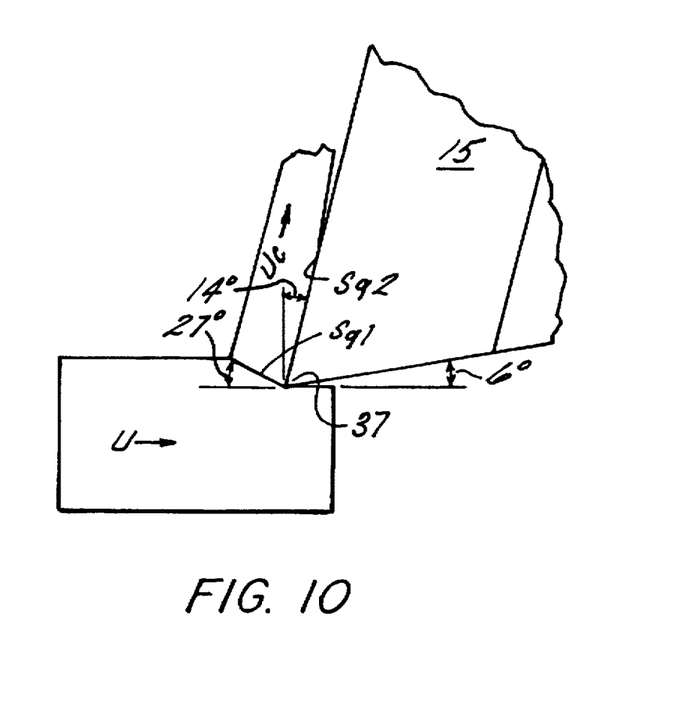
FIG. 10 is another view of the cutting tool depicting surfaces referred to in the equations.

FIGS. 7 and 8 illustrate the cutting tool employed during the trial. In the illustrations, insert 10 is maintained in position above the cooling element 1, on the tool holder 15, by clamp 20. The cooling element in the example is a copper seat 25 harboring therewithin a restricted diameter channel 3 through which a preselected fluid is passed. The fluid reaches the channel 3 through feed 42 extending, with larger cross sections, from the rear 35 of the tool holder 15, to the cutting end 40 of tool holder 15 where cutting edge 37 is located. Feed 42 is reduced in diameter as it approaches restricted channel 3 of cooling element 1. It should be noted that in this example, restricted channel 3 is 2 mm in diameter and travels proximately to a perimetrical edge of the cooling element 1. It will be understood that where the restricted channel 3 does not meander repetitively through the cooling element 1, only reduced cooling is achieved; significantly more cooling can be achieved by constructing cooling elements with longer restricted channel per unit area.

The comparison employed is among: dry cutting, wet cutting and dry cutting using the device of the invention. A finite element model (FIGS. 9 and 10) of a turning process for low carbon steel using a high speed steel cutting tool is used. Cutting conditions, material properties, heat generation data, and boundary conditions are considered, for the case of wet cutting, from previously published work of Childs, T. H. C., Maekawa, K., and Maulik, P., "Effects of Coolant on Temperature Distribution in Metal Machining", Material Science and Technology, Vol. 4, November 1988. (hereinafter Childs et al). For the other two cases, new boundary conditions are estimated analytically to fit each case, while both of the cutting conditions and the heat generation data are assumed to be the same for simplicity.

Cutting conditions:

Turning process on a lathe using a water based coolant subject to the following conditions:

| | |
|---|---|
| Clearance angle = 6° | Cutting speed (U) = 61 m/min |
| Tool rake angle - 14° | Chip contact length = 1.38 mm |
| Shear plane angle = 27° | Chip velocity ($U_c$) = 28.4 m/min |
| Cutting force = 1200 N | Depth of cut = 2.54 mm |
| Thrust force = 550 N | Cutting fluid: water based coolant flooded |
| Feed rate = 0.254 mm/rev. | directly onto the tool at rate of 2.5 liter/min in a stream having a diameter of about 10 mm. |

THERMAL PROPERTIES

| Material | Thermal conductivity (K) at T = 400° C. | Specific heat × Density (C × p) |
|---|---|---|
| Work and chip (0.43% C steel) | 43.6 W/m.K | 4.3 × 10$^6$ J/m$^3$.K |
| Tool tip or insert (high speed steel) | 22.0 W/m.K | |
| Tool holder (low carbon steel) | 45.0 W/m.K | |

Assumptions:
the following assumptions are made for simplicity:

1. Two-dimensional steady-state conditions.
2. Heat transfer within the tool, the copper seat, and the tool holder is by conduction only. In the moving chip and work material, heat is transferred by conduction and convection (mass transport of heat). No radiation effect is considered.
3. External chip and work surfaces are assumed thermally insulated.
4. Constant properties for all materials.
5. No volume heat generation within the chip or work material.
6. Observed built-up-edge is included in the model and assumed to be fixed to the tool.
7. No effect of the machine on the tool holder.
8. Sharp tool.

Figure 11:
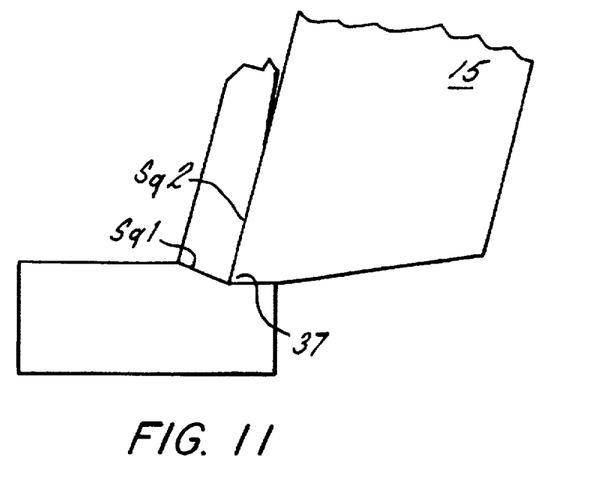
FIG. 11 is another view of the cutting tool depicting surfaces referred to in the equations.

The localization of heat generation is approximated into the two surfaces shown in FIG. 11 and discussed below:

1. The primary shear plane ($S_{q1}$)

$$q_1 = kU_1 \quad (6)$$

where, $q_1$ is the heat generation on $S_{q1}$
k is the shear flow stress of the chip, function of the applied forces and the shear angle.
$U_1$ is the velocity change from the work to the chip.
k=500 MN/m$^2$, and $U_1$=59 m/min, calculated from the machining test data.
$q_1$=500×10$^6$×59×1/60
=491.66×10$^6$W/m$^2$ 2. The friction plane ($S_{q2}$)

$$q_2 = \tau U_c \quad (7)$$

where, $q_2$ is the heat generation on $S_{q2}$
τ is the friction stress distribution, shown in FIG. 11, and evaluated experimentally.
$U_c$ is the sliding speed of the chip, calculated from the machining test ($U_c$=28 m/min).

Figure 12:
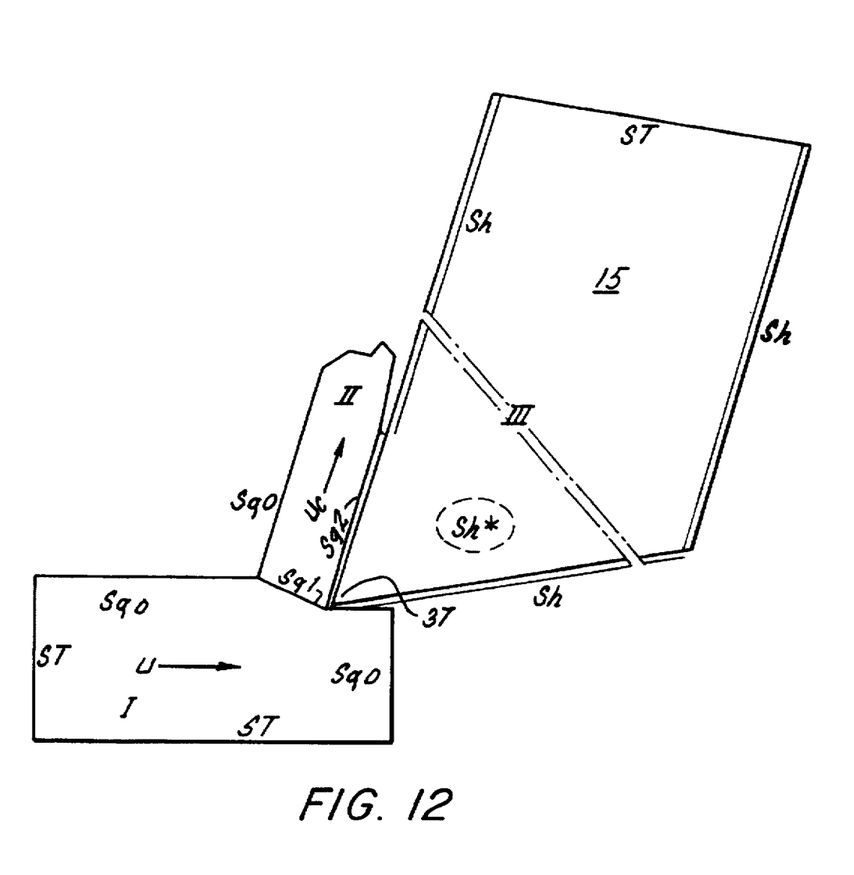
FIG. 12 is a view of the cutting tool in use illustrating areas of boundary condition mathematically referred to in the example.
Figure 13:
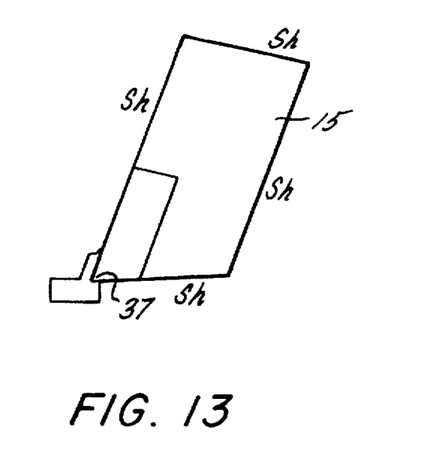
FIG. 13 is a view of the cutting tool in use illustrating areas of boundary condition mathematically referred to in the example.
Figure 14:
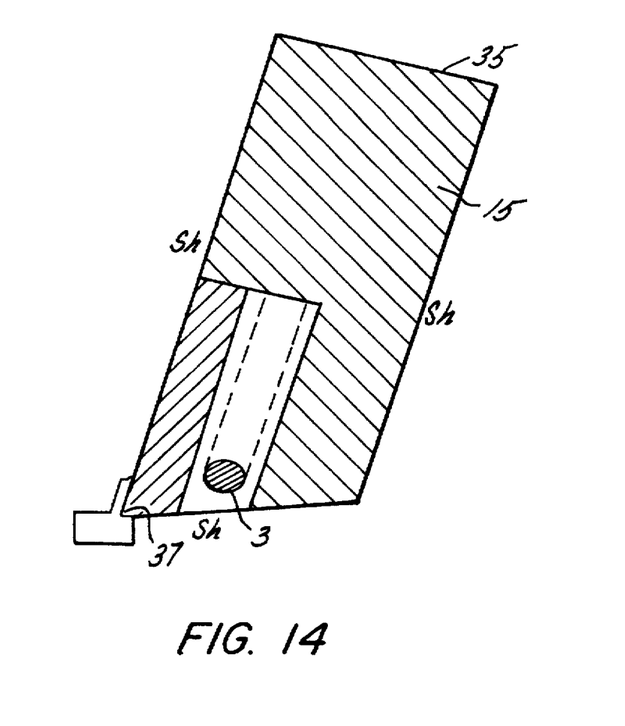
FIG. 14 is a view showing the cutting tool of the invention and identifying surfaces of mathematical calculation in the example

The Governing Equation:

In each of the three regions I, II, III of FIG. 12, the governing energy equation is:

$$K\left(\frac{\partial^2 T}{\partial x^2} + \frac{\partial^2 T}{\partial y^2}\right) - pC\left(u_x\frac{\partial T}{\partial x} + u_y\frac{\partial T}{\partial y}\right) = 0 \quad (8)$$

where,

K is the thermal conductivity,
T is the temperature
p is the mass density,
C is the specific heat, and $u_x$ and $u_y$ are the components of the velocity in directions x and y.

This governing energy equation is subject to the following boundary conditions:

Boundary Conditions:

(i) $T = T_s$ on surfaces $S_t$ (ii) $-K\frac{\partial T}{\partial n} = 0$ on surfaces $S_{q0}$ (iii) $-\left(K\frac{\partial T}{\partial n}\right)_I - \left(K\frac{\partial T}{\partial n}\right)_{II} = q_1$ on surface $S_{q1}$ (iv) $-\left(K\frac{\partial T}{\partial n}\right)_{II} - \left(K\frac{\partial T}{\partial n}\right)_{III} = q_2$ on surface $S_{q2}$ (v) $-K\frac{\partial T}{\partial n} = h(T - T_0)$ on surfaces $S_h$ and in case of internal duct within the device:

(vi) $-K\frac{\partial T}{\partial n} = h^*(T - T_0)$ on surfaces $S_{h^*}$ where, n is the direction normal to $S_{q1}$, $S_{q2}$, $S_h$ or $S_{h^*}$ as appropriate.
$T_0$ is the ambient temperature,
and h, h* are the convention heat transfer coefficients on the surface $S_h$ and $S_{h^*}$, respectively.

Hiroaka, M. and Tanaka, K, "A Variational principle Transport Phenomena", Memoir, Faculty Eng., Kyoto Univ., 30, 235–263, 1968 (hereinafter Hiroaka and Tanaka), showed that solving equation (8) subject to the boundary conditions is equivalent to minimizing the functional I(T) defined as:

$$I(T) = \int_A \frac{K}{2}\left[\left(\frac{\partial T}{\partial x}\right)^2 + \left(\frac{\partial T}{\partial y}\right)^2\right] dA +$$

$$\int_A pC\left(u_x\frac{\partial \bar{T}}{\partial x} + u_y\frac{\partial \bar{T}}{\partial y}\right) T dA +$$

$$\int_{S_q} qT dS + \int_{S_h} h\left(\frac{T^2}{2} - TT_0\right) dS$$

where A and S indicate area and surface integral, respectively, and where the temperature gradients $\partial \bar{T}/\partial x$ and $\partial \bar{T}/\partial y$ are variationally invariant. The minimization of I(T) with respect to the unknown function T forms the finite element method.

Three cases of boundary conditions are considered for the comparison:

Case 1: Dry cutting

The boundary surface $S_h$ is the surface of the natural convective heat transfer for both of the tool and the tool holder. Since air is a poor heat conductor and the temperatures on $S_h$ are not extremely high, heat losses to the air by conduction, convection and radiation are negligibly small (Childs et al). Childs et al showed that within about 1 mm of the cutting edge on the tool flank surface the closeness of this surface to the cooler machined surface can result in conductive heat losses in dry air with a mean heat transfer coefficient, h, of about $10^3$ w/m²K. Therefore, a small value of h(10 w/m²K) is used on all the external surface $S_h$ except at this small surface, mentioned above on the tool flank. The ambient temperature $T_0=20°$ C. is applied on all external surfaces.

Case 2: Wet cutting

The value of convective heat transfer coefficient (h), from the tool to the coolant, is, determined from previous published work of Childs et al, in the range of $10^3$ to $10^4$ W/m²K. Therefore, the value of h is average at $5\times10^3$ to give the most reasonable results for the effect of coolant in this case. Also, the ambient temperature $T_0=20°$ C.

Case 3: New cooling device

In addition to the same boundary conditions of case 1, the internal surface of the insert is attached to a copper seat with high thermal conductivity (385 W/m.K), and an internal duct with 2 mm diameter is constructed in both of the copper seat and the tool holder (See the device configuration in FIGS. 7 and 8). The duct is subjected to heat transfer convection due to the effect of the cooling fluid followed at high Renold's Number. In the case of using a closed cycle system, as shown in FIG. 8, with water as the cooling fluid, the estimated values of $h^*=10^5$ W/m²K, as stated hereunder, and $T_0=20°$ C.

Figure 15A:
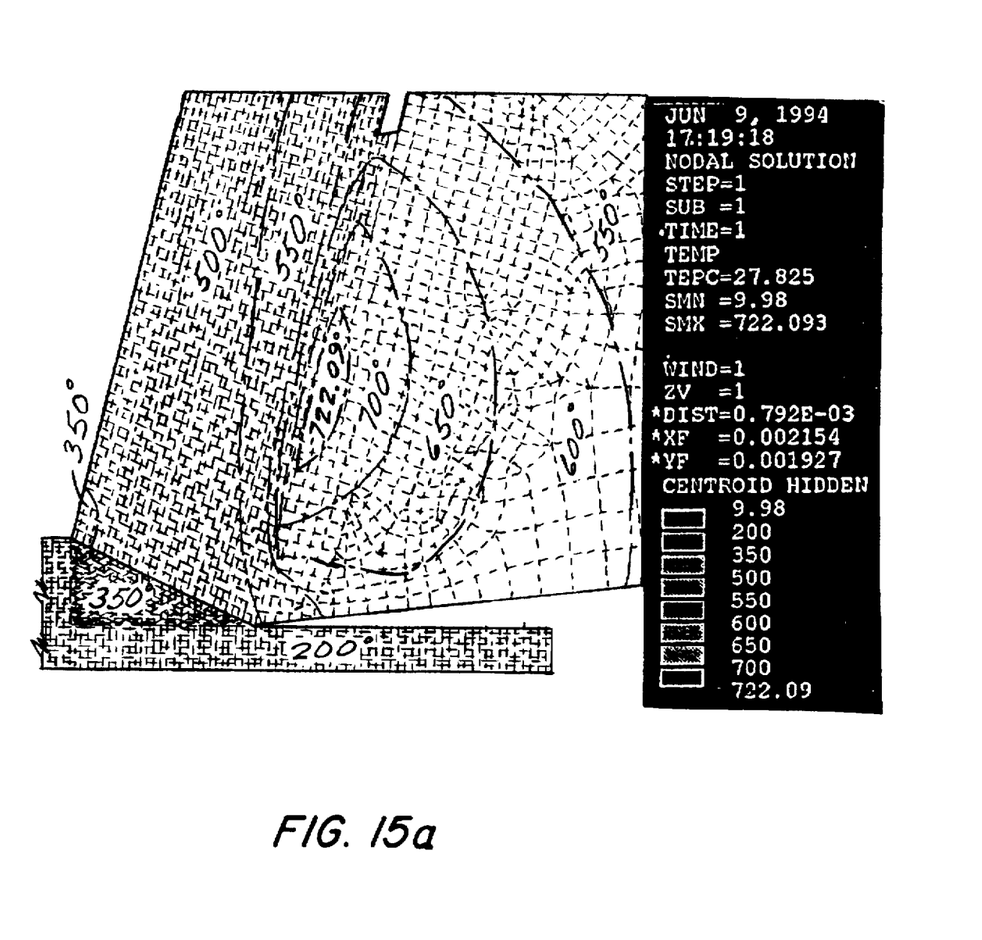
FIG. 15a illustrates in three dimensional graphics, the heat generated in the rake force of the tool for a dry cutting tool.
Figure 15B:
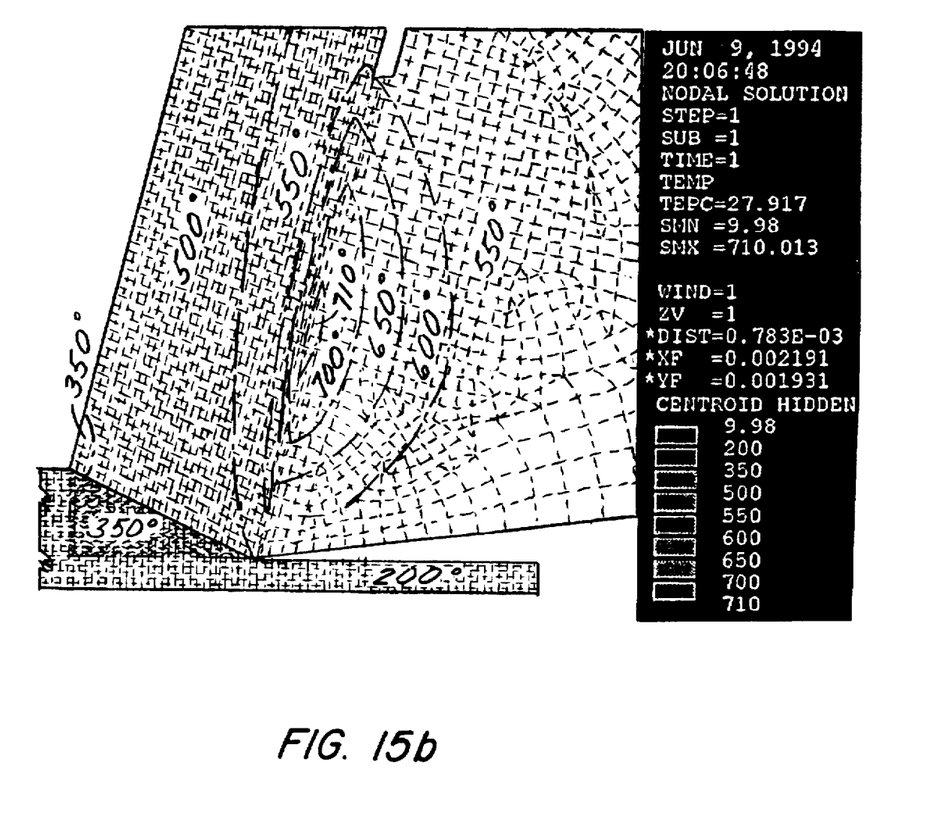
FIG. 15b illustrates in three dimensional graphics, the heat generated in the rake force of the tool for a wet cutting tool.
Figure 15C:
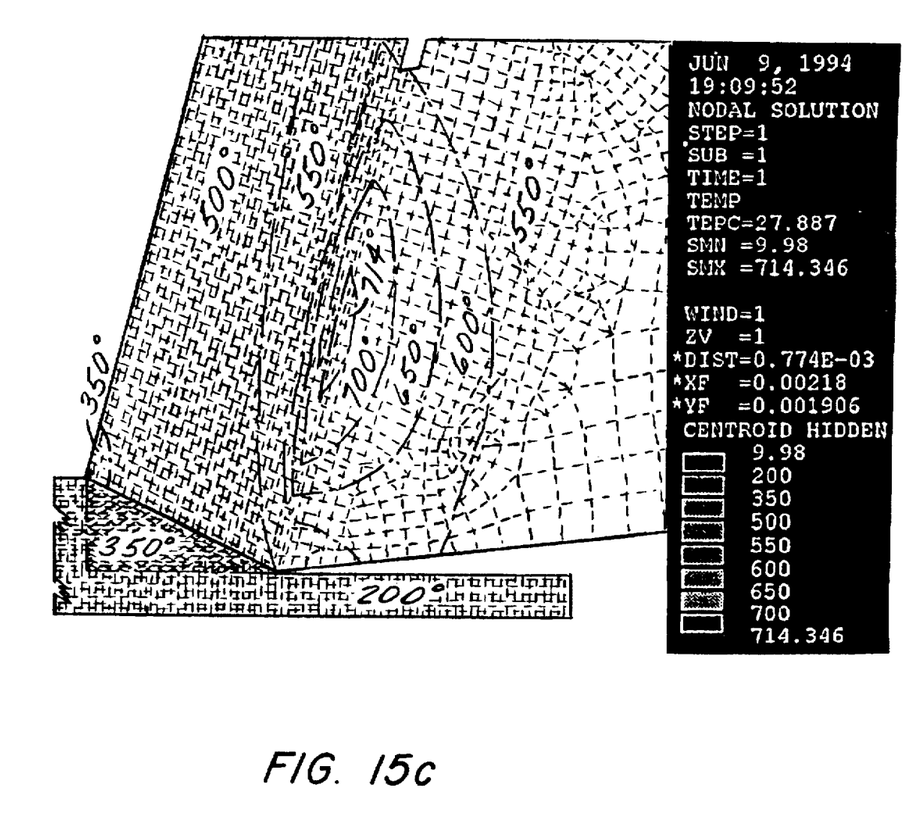
FIG. 15c illustrates in three dimensional graphics, the heat generated in the rake force of the tool for a cooling device equipped tool.
Figure 16A:
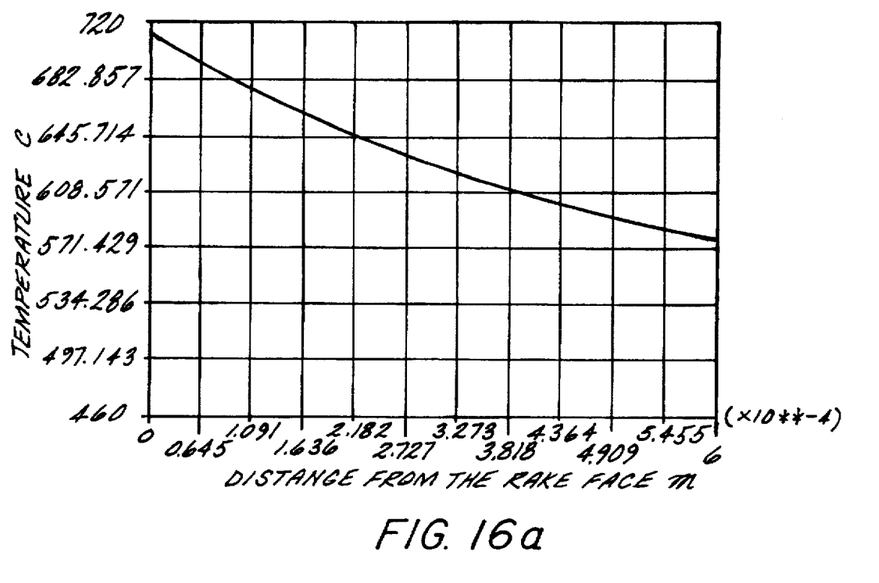
FIG. 16a graphically illustrates temperature curves for a dry cutting tool.
Figure 16B:
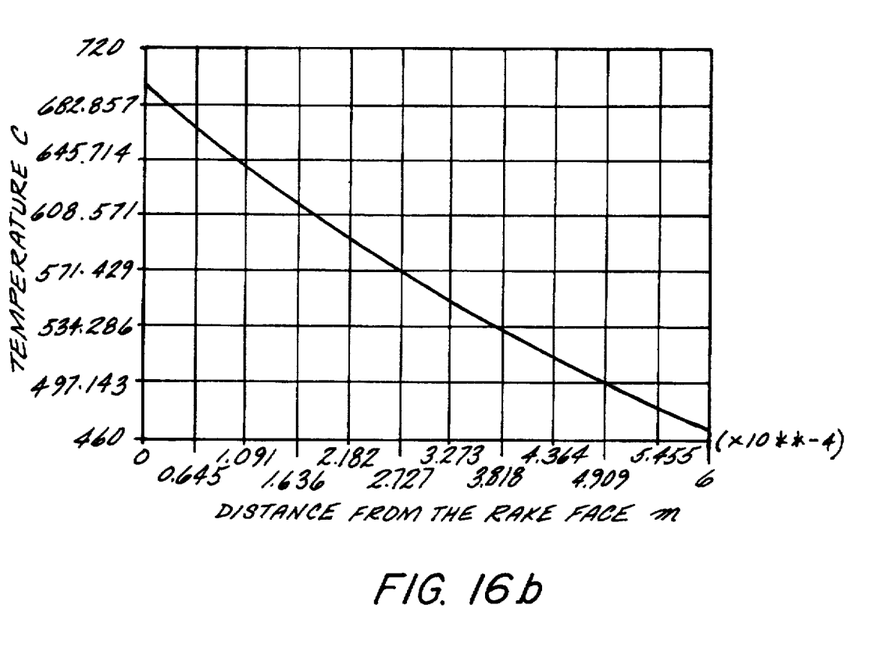
FIG. 16b graphically illustrates temperature curves for a wet cutting tool.
Figure 16C:
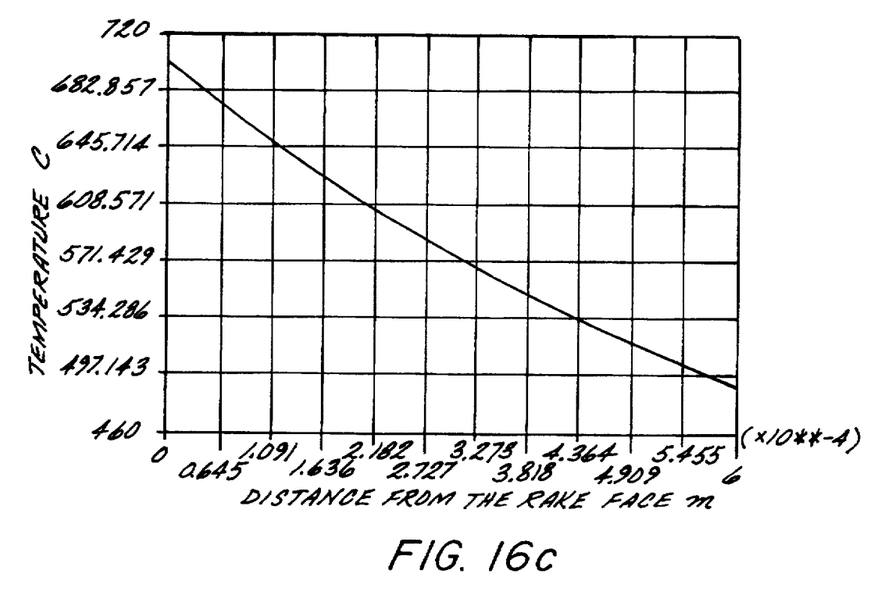
FIG. 16c graphically illustrates temperature curves for a cooling device equipped cutting tool.

Solution and Results:

Using ANSYS Finite Element Analysis program, temperature distribution is obtained for each case, and temperature contours are plotted in FIGS. 15a–c with FIG. 15a being dry cutting, 15b being wet cutting and 15c being cutting with the cooling device of the invention. Temperature obtained along a path starting from the hottest point on the rake face and going through the maximum temperature gradient inside the tool are shown in FIGS. 16a–c with FIG. 16a being dry cutting, 16b being wet cutting and 16c being cutting with the cooling device of the invention. These graphs were based on the fact that the composition of the crater wear begins at the location of the maximum temperature on the rake face (Childs et al).

For the three cases of loading, temperature and an approximate temperature gradient are obtained at the maximum rake face temperature location as follows:

| Case of Loading | Dry cutting | Wet cutting | New cooling device |
|---|---|---|---|
| Maximum Temp °C. | 712.6 | 696.5 | 701.8 |
| Approx. Temp. Grad. °C./mm | 360.8 | 537.2 | 497.2 |

From the above results and plots, it can be concluded that a significant amount of the cooling effect of the cutting fluid (about 70%) can be compensated for by the use of the device. Overheated areas at the tool tip are reduced compared to the case of dry cutting, and consequently, less wear and longer tool life can be achieved.

Estimation of the convection heat transfer coefficient (h*) from the copper seat to the internal coolant Known:

Hydraulic Diameter of the internal circular duct, $D_h=2.0$ mms.

The cooling fluid is water at 20° C. with the following properties:

| | |
|---|---|
| Prandtl number | $P_r = 6.99$ |
| Thermal Conductivity | $K = 0.5996$ W/m.K |
| Density | $\rho = 998.3$ kg/m³ |
| Dynamic viscosity | $\mu = 1.003 \times 10^{-3}$ kg/m.s |
| Coolant discharge rate | $Q_c = 5.0$ liter/min |

Assumptions:

Turbulent flow in smooth pipes.

Fully developed flow.

The boundary conditions at the wall of the duct are uniform heat flux or uniform wall temperature.

Analysis:

$$\text{Discharge rate} = \rho\, V\Pi D^2/4$$
$$= 5.0/1000\ \text{m}^3/\text{min} \times 998.3\ \text{kg/m}^3$$
$$= 4.9915\ \text{kg/min} = 0.08319\ \text{kg/s}$$

Therefore, the value of the coolant velocity inside the duct (V) can be calculated from the above formula and equals to 26.526 m/s. Reynolds number $Re_D=\rho VD/\mu=0.528\times10^5$ To calculate the flow friction factor (f) for fully developed turbulent flow for a smooth circular duct, Techo et al. correlation can be used., Techo R., Tickner R. R., and James R. E., "An Accurate Equation for the Computation of the Friction Factor for Smooth Pipes from the Reynolds Number", J. Appl. Mech., vol. 32, p. 443, 1965.

$$\frac{1}{\sqrt{f}} = 1.73721 n \frac{Re}{1.9641 nRe - 3.8215} \quad (17)$$

to get f=0.005164

Also, to get the Nusselt number for smooth-walled ducts, Gnielinski correlation is used. Gnielinski V., "New Equations for Heat and Mass Transfer in Turblent Pipe and Channel Flow", Inc. Chem. Eng., vol. 16, pp. 359–368, 1976.

$$Nu = \frac{(f/2)(Re-1000)Pr}{1+12.7(f/2)^{1/2}(Pr^{2/3}-1)} \quad (18)$$

Where the value of Nu was calculated as 344.47

Figure 1:
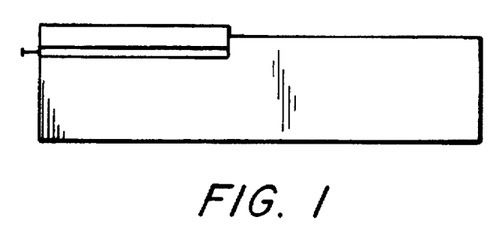
FIG. 1 is a diagrammatic view of the invention.
Figure 2:
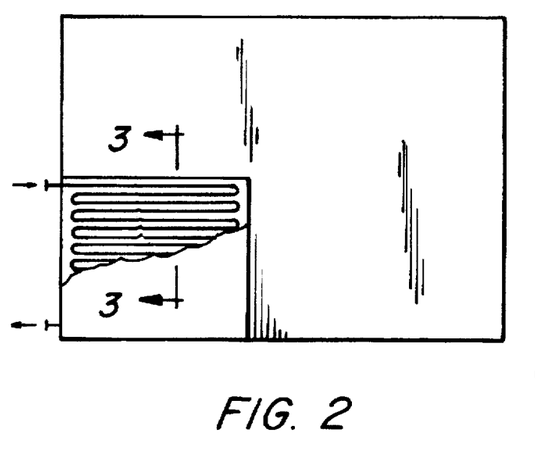
FIG. 2 is a plan view of a cooling element of the invention.
Figure 3:
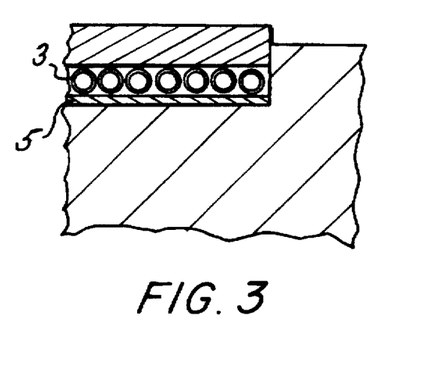
FIG. 3 is a cross section view of FIG. 2.
Figure 4:
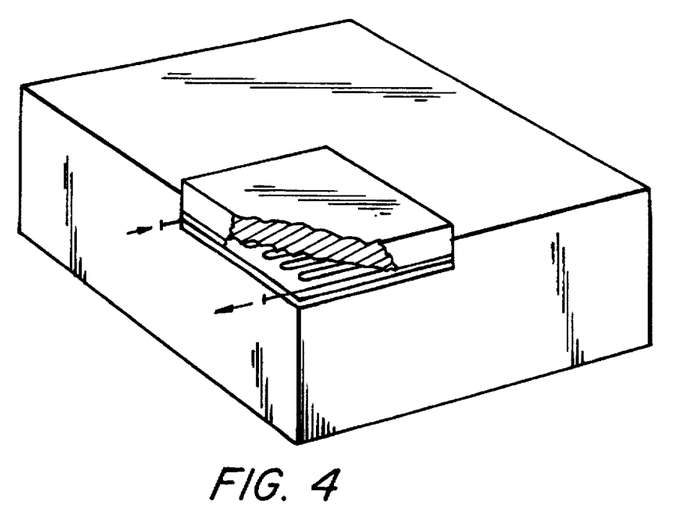
FIG. 4 is a perspective view of one embodiment of the invention broken away to show the cooling element under the mounted cutting tool.
Figure 5:
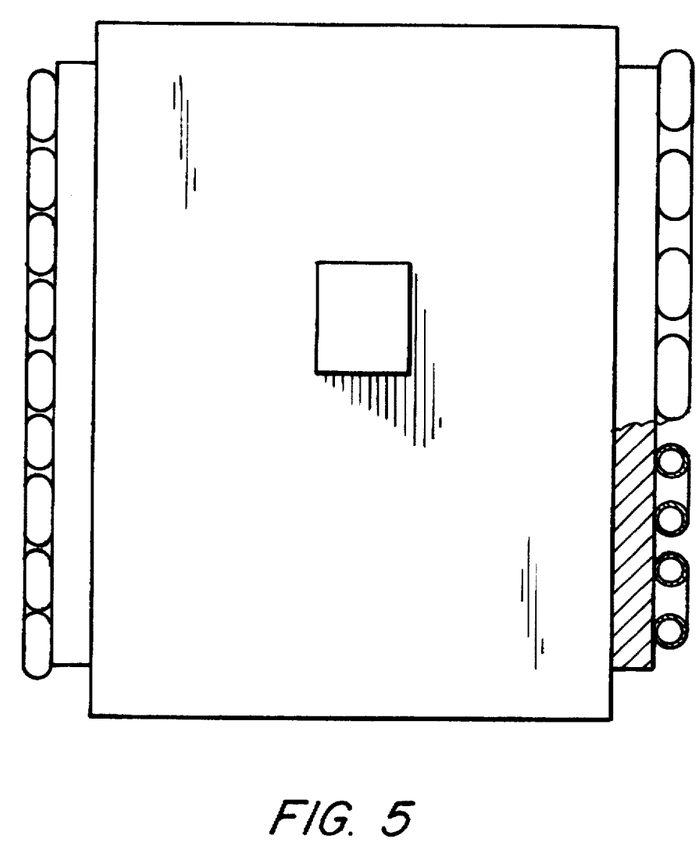
FIG. 5 is a perspective view of a second embodiment of the invention wherein two cooling elements are shown in contact with a conductive cutting tool holder.

Another preferred embodiment, as illustrated in FIG. 5, utilizes a tool holder of a particularly heat conductive material and one or more cooling elements placed in contact with the tool holder. Choice of number of elements is dependent on expected temperature of the tool, speed of manufacture of object items and desired cooling. The embodiment shown in FIG. 5 illustrates two cooling elements 1. It will be understood, however, that the cooling elements may be placed on each wall of the tool holder to increase cooling. This could be as many as six elements on a square tool holder providing that the mounting for the holder and the mounting for the tool are accessible.

Figure 17:
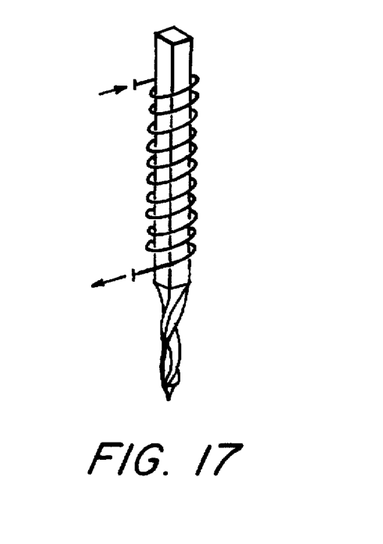
FIG. 17 is a schematic illustration of an alternate embodiment of the invention where a restricted channel cooling element is wound directly around the shank of a cutting tool.

In still another preferred embodiment the cooling element comprises only a restricted channel having no support plate. In this embodiment the restricted channel is simply wound around the shank of the cutting tool itself. This is illustrated schematically in FIG. 17.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An environmentally safe cutting tool cooling device in combination with a cutting tool comprising:

a) a solid cutting tool having a cutting edge;

b) a tool holder adapted to receive and hold said tool; and c) a cooling element mounted to said holder, said element comprising a conduit having a restricted diameter region and at least one relatively larger diameter region on at least an inlet side of the conduit, said restricted diameter region being located conductively nearest said cutting edge of said cutting tool and being a closed circuit near said cutting tool such that the cutting tool remains unexposed to an environmentally benign cooling fluid flowing through said conduit, said conduit being constructed to create a condition such that when said cooling fluid passes therethrough, the fluid shall exhibit a lower temperature in the restricted diameter region than the temperature of the fluid prior to entering the restricted diameter region of the conduit, said at least one relatively larger region of the conduit being connected to a fluid supplier and supply, whereby said fluid supply being supplied to said conduit reduces the temperature of the restricted conduit and cools the cutting tool.

2. An environmentally safe cutting tool as claimed in claim 1 wherein the restricted conduit is mounted on a support means.

3. An environmentally safe cutting tool cooling device in combination with said cutting tool as claimed in claim 1 wherein the restricted conduit is wound around a shank of said cutting tool.

4. An environmentally safe cutting tool as claimed in claim 2 wherein the restricted conduit on a support means is placed in contact with a tool holder.

5. An environmentally safe cutting tool cooling device as claimed in claim 1 wherein the cooling element is connected to means for moving fluid through the cooling element.

6. A method of cooling articles including:

(a) providing a cooling element having an elongated conduit including a restricted diameter region and a relatively larger diameter region, said conduit constructed to create a condition such that when an environmentally benign fluid passes through said restricted diameter region of the conduit, the fluid shall exhibit a lower temperature than the condition of the fluid prior to entering the restricted diameter region of the conduit, said relatively larger diameter region of the conduit being connected to a fluid supply and supplier for moving the fluid through said conduit;

b) positioning said cooling element in proximity to a cutting tool such that said restricted diameter region of said conduit is nearest a cutting edge of said cutting tool;

c) urging fluid through the cooling element to cool the restricted diameter region of the conduit and thereby conductively lowering the temperature of the cutting tool.

7. An environmentally safe cutting tool cooling device in combination with a cutting tool as claimed in claim 1 wherein the fluid is water.

8. An environmentally safe cutting tool cooling device in combination with a cutting tool as claimed in claim 1 wherein the fluid is air.

* * * * *